United States Patent [19]

Bunting et al.

[11] Patent Number: 4,637,647

[45] Date of Patent: Jan. 20, 1987

[54] FIELD DECOY TRANSPORT DEVICE

[75] Inventors: Franklin O. Bunting; J. Russell Hudson, both of Dagsboro, Del.

[73] Assignees: Richard W. Gaffney, Brooklyn Heights, N.Y.; Oliver M. Walker, Bethesda, Md.

[21] Appl. No.: 833,354

[22] Filed: Feb. 24, 1986

[51] Int. Cl.⁴ ............................................. B60R 7/00
[52] U.S. Cl. .................... 296/24 R; 211/162; 248/503
[58] Field of Search ............. 296/24 R, 21; 211/162, 211/41; 248/503, 500, 499; 210/77, 94, 52

[56] References Cited

U.S. PATENT DOCUMENTS 3,294,247 12/1966 Norrington .................. 224/42.42 R
3,589,768 6/1971 Wilson ............................ 296/24 R
3,929,371 12/1975 Gibson ............................ 296/24 R

FOREIGN PATENT DOCUMENTS 128431 5/1932 Austria ............................ 296/24 R Primary Examiner—Robert R. Song
Attorney, Agent, or Firm—John E. Lyngh

[57] ABSTRACT

Mobil trailer device for transporting a set of field decoys comprising taxidermied Canada geese in the sentinel and feeder positions mounted on rectangular bases including a wheeled enclosure containing vertical stacks of spaced apart channel pairs for slideably engaging the rectangular bases to hold the decoys in side by side rows.

11 Claims, 6 Drawing Figures

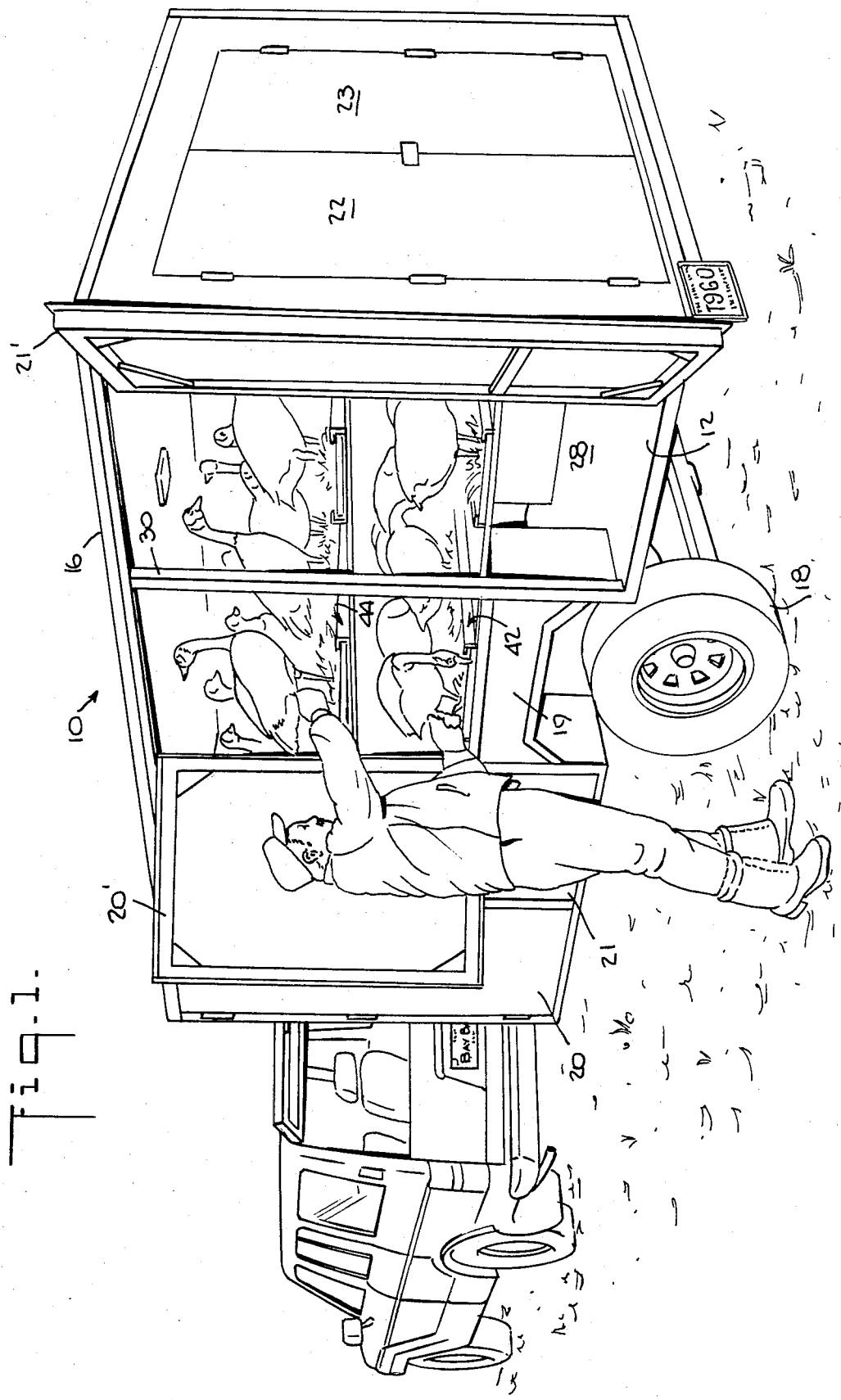

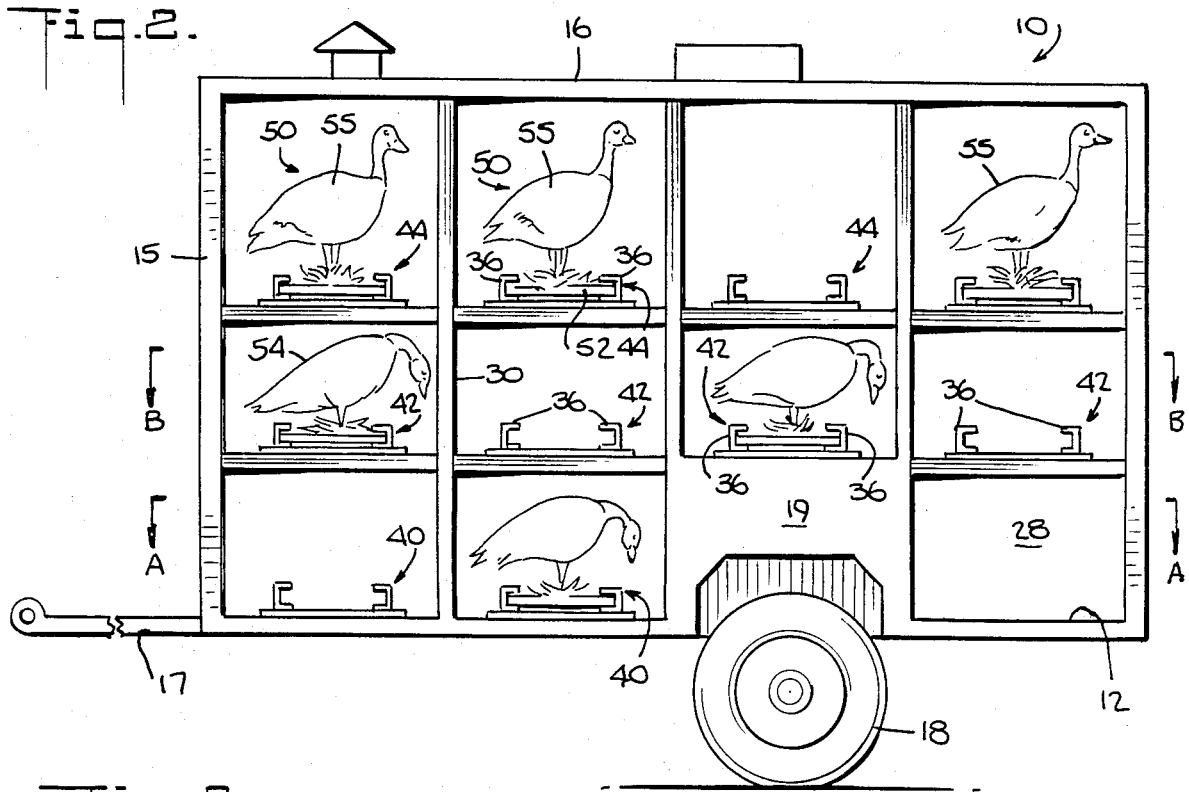
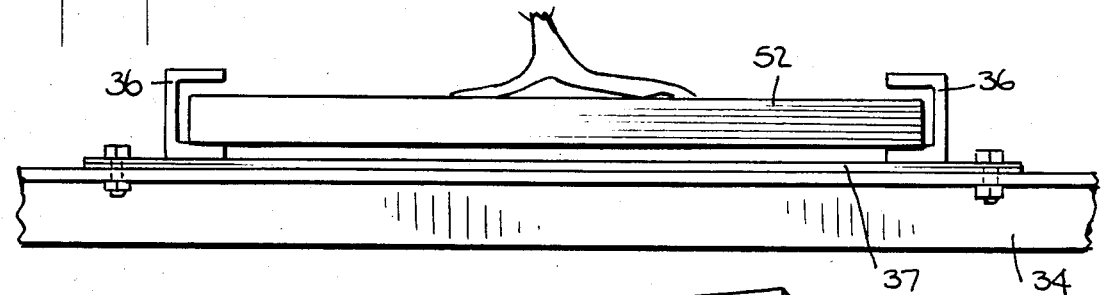
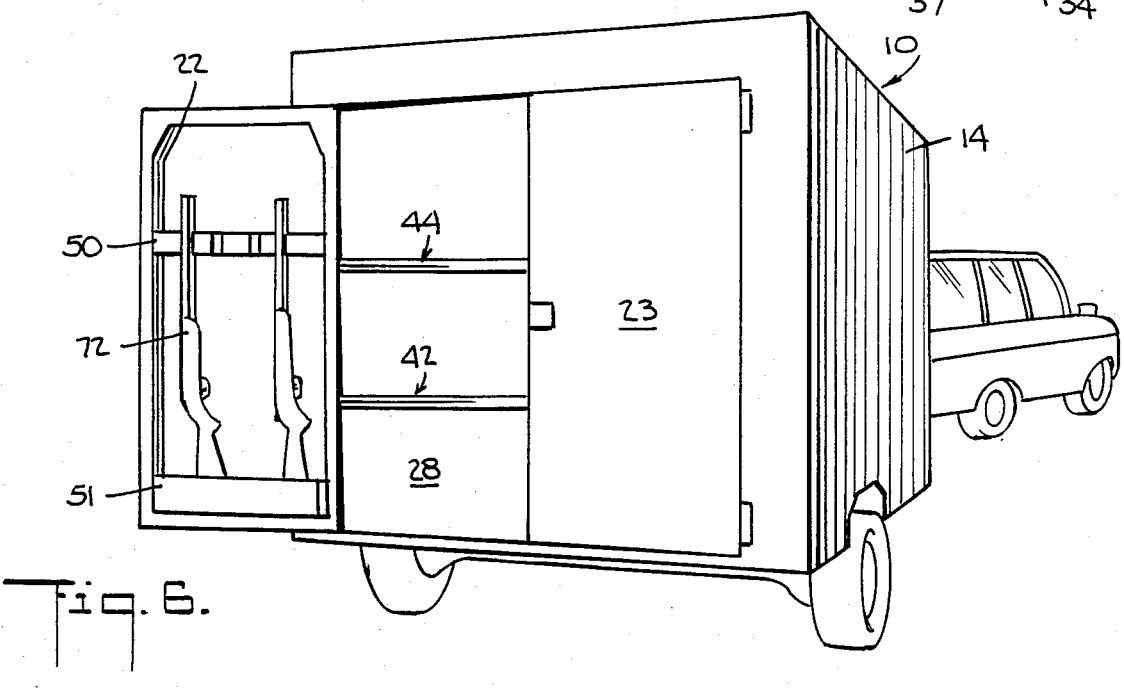

FIELD DECOY TRANSPORT DEVICE

This invention relates to an enclosed trailer-like device for transporting and storing a set of field decoys comprising taxidermied Canada geese or the like mounted on bases in the sentinel and feeder positions.

The Canada goose (*Branta canadensis*), a migratory animal, has demonstrated an ability to readily adapt to changes in its food supply. A grass and grain eater, the Canada goose has become a common sight on suburban parks and golf courses. In contrast to other waterfowl such as the black duck (*Anas rubripes*), the canvasback duck (*Aythya valisineria*) and the redhead duck (*Aythya americana*) whose population has declined in recent years, the number of Canada geese has increased steadily since the 1940's because of its ability to adapt. Bellrose, *Ducks, Geese & Swans of North America*, Stackpole books (1976) pp. 142-3. Many years ago, Canada geese wintered in the Carolinas where they found a ready supply of eel grass to feed on. When this food supply became scarse, the Canada found a replacement in Delaware and on the Eastern Shore of Maryland where the advent of mechanical crop pickers left corn in the fields for the geese to feed on.

While appearing nearly tame at other times of the year, during the hunting season, the Canada goose becomes wily and is not easily fooled. Hunting has done little to stem the goose population even with increased bag limits, testimony to the goose's sharp eyes and cunning.

Hunters had to adapt as well and developed pit blinds and field decoys in response to the shift to field feeding on corn. Early field decoys were silhouettes cut from plywood and stuck in the ground. Others used old tires cut in half with the replica of a goose head and neck stuck on. These decoys did not work for long because they were not life like. Full body plastic decoys were more life like but the wily goose soon learned to shun these as well.

With inspiration from a time when tame live geese were legal for hunting, hunters found that a set of taxidermied geese would fool their live cousins far better that artificial decoys.

A proper field rig includes thirty or more taxidermied geese in the sentinel and feeding positions. Because of their fragile nature and value, taxidermied decoys have to be set out each morning and picked up each night or when shooting for the day is over. Unlike flat silhouettes and molded shell bodies which could be left in the field for extended periods and then stacked or nested for storage, taxidermied decoys require careful handling and a secure enclosure for storage and transport.

At first, taxidermied decoys on rectanguler bases were carried in the back of a covered pick-up truck and, as the size of a rig grew, sliding tray-like affairs were employed. These measures were not entirely satisfactory because of crowding and damage to the decoys from constant handling. Moreover, off-season storage required an enclosure secure from vermin and the like.

The present invention avoids these and other problems by providing a trailer-like enclosure with vertical stacks of horizontal pairs of channels into which the decoy bases slide for safe and secure transport and storage yet easy access in the field with a minimum of damage from handling.

The present invention will be more readily understood from the following description and the accompanying drawing wherein:

FIG. 1 is a perspective side view of the apparatus of the invention shown attached to a vehicle for towing;

FIG. 2 is a side view of the apparatus of FIG. 1 shown with the doors removed;

FIG. 5 is a cross sectional view of a channel pair with a decoy base slideably retained therein;

FIG. 6 is a rear perspective view of the apparatus shown in FIG. 1.

Figure 3:
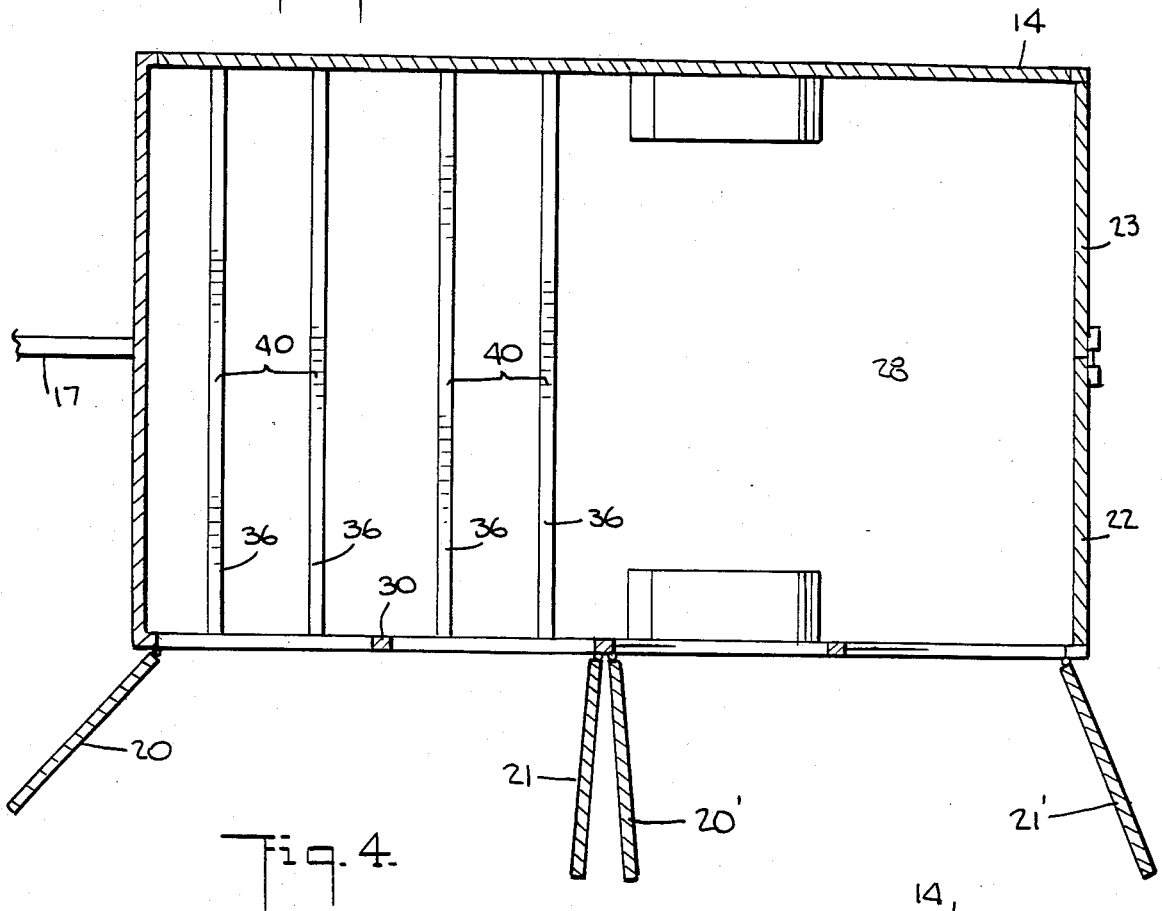
FIG. 3 is a top plan view taken along line A—A of FIG. 2.
Figure 4:
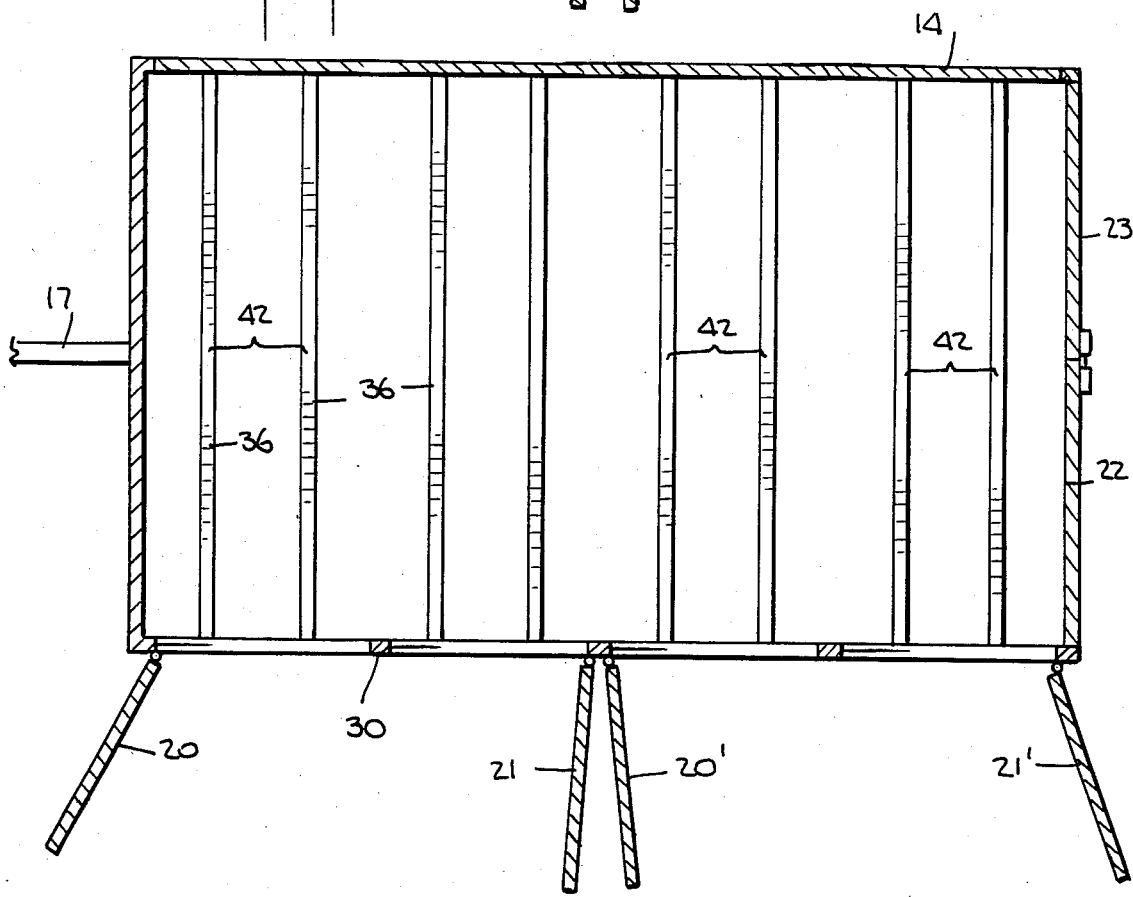
FIG. 4 is a top plan view taken along line B—B of FIG. 2.

Referring now to the drawing, the apparatus of the invention for transporting and storing a set of taxidermied goose decoys (shown generally by reference numeral 50) mounted on a rectangular base 52 in the sentinel position 55 or the feeder position 54 (FIG. 1), includes a wheeled enclosure 10 having a floor 12, side walls 14, front wall 15 and roof 16. In the embodiment shown, one side wall is formed by two pairs of double doors 20, 21 and 20', 21' and the rear wall is formed by a pair of double doors 22, 23.

Wheels 18 with a conventional axel therebetween are located aft of the center line of the enclosure 10. This provides tongue weight forward so that the hitch device 17 puts downward pressure on the towing vehicle. This prevents any lifting of the towing vehicle rear when crossing a rough field which would otherwise interfere with traction by the vehicle.

As shown in FIGS. 1 and 2, pairs of opposing channel members 36 extend transversly across the enclosure 10 from side to side. The opposing channel members 36 are adapted to engage the decoy bases 52 to securely and firmly retain the decoys 50 in side by side transverse rows.

In the forward section of enclosure 10, a first pair 40 of members 36 is secured to the floor 12 and second and third pairs 42 and 44 are spaced thereabove in vertical alignment forming a stack or plurality of racks. It is preferred that spacing be provided for relatively easy access to the decoys for transverse removal and insertion of the bases 52 between channel members 36 with a minimum of bumping as to minimize any damage to the decoys 50.

Forward door 20 is also positioned and dimensioned to facilitate removal and replacement of the decoys without harm. It is preferred to position sentinel decoys 55 in the upper pairs 44 and feeder decoys 54 in the lower pairs 40 and 42. It is also preferred to face all of the decoys in a given row in the same direction such as reward as shown. Pull means such as a stick and hook are used to slide the decoys foward for unloading.

Doors can also be provided in side wall 14 for more rapid loading and unloading of the decoys. Means can also be provided to latch the doors open against the wind.

The channel members 36 are preferably made of steel which may be conveniently welded to cross members 37 to form unitary pairs 40, 42, 44 etc. Cross member 37 provides a means for securing the pairs to the floor 12 and at levels thereabove from side to side across the enclosure 10. For example, pairs 42 and 44 can be secured via bolts (FIG. 3) to horizontal frame members 34 which extend around the interior periphery of enclosure 10.

Doors 20 and 21 close on each other at vertical post 30 and are latched in place and locked by suitable means. Doors 20' and 21' close and lock in a similar manner as do doors 22 and 23.

Door 21 provides access to a similar vertical stack of channel pairs 36 as does forward door 20. Door 20' provides access to pair 42 of members 36 above the floor 12 attached to wheel enclosures 19 and pair 44 thereabove. Door 21' provides access to upper pairs 42 and 44 with no pair 40 on the floor 12 so as to provide storage space 28 below pair 42 for gear and shot birds. Doors 22 and 23 provide access to storage space 28 as does door 21'. The inside of doors 22 and 23 are ideally suited for mounting gun racks 50, 51 for transporting shotguns 72 in the field.

Vent 24 and skylight 26 can be provided in roof 16. Forced circulation means such as a fan can also be provided at a convenient location so as to cause maximum circulation of air in the enclosure 10. Heater means can also be added to assist drying. Lights in the interior are helpful in the early morning darkness.

The enclosure 10 is preferably made of a unitary welded frame to which the floor 12, walls 14 and 15 and the various doors are attached. A composite of painted plywood to the inside and galvanized sheet metal to the exterior has proven satisfactory for the various parts forming the enclosure 10. Other materials such as aluminum sheeting and molded figerglass may also be used to form the enclosure.

What is claimed:

1. Apparatus for transporting and storing a set of taxidermied water fowl decoys such as Canada geese mounted on rectangular bases comprising:
   (a) wheeled enclosure means having a floor, side walls and a roof and trailer attachment means for vehicle towing;
   (b) a plurality of horizontal pairs of opposing channel members mounted transversely on the floor of the enclosure means and at at least one level thereabove from side wall to side wall in vertical alignment therewith;
   (c) said channel pairs slidably receiving the decoy bases to retain a side by side row of said decoys; and
   (d) the side walls, of said enclosure means having vertical door means for each vertical stack of channel pairs positioned to permit the transverse withdrawal and insertion of said decoys.

2. Apparatus of claim 1 having channel pairs at two levels above the floor mounted pairs in vertical alignment, the top level being adapted to retain sentinel decoys and the pairs therebelow feeder decoys.

3. Apparatus of claim 1 having at least two vertical stacks of channel pairs with the floor mounted pair of one stack being removed for gear and game storage.

4. Apparatus of claim 3 wherein said storage space is located at the rear of the enclosure means and the rear wall thereof has door means to provide access thereto.

5. Apparatus of claim 1 having ventilation means.

6. Apparatus of claim 1 having skylight means.

7. Apparatus of claim 1 having gun rack means mounted to the inside of the door means.

8. Apparatus of claim 4 having gun rack means mounted to the inside of the rear wall door means.

9. Apparatus of claim 1 having means to assist the drying of the decoys when wet.

10. Apparatus for transporting and storing a set of taxidermied goose decoys mounted on rectangular bases in sentinel and feeder positions comprising:
    (a) wheeled enclosure means having a floor, side, rear and front walls and a roof and trailer attachment means for vehical towing;
    (b) plurality of horizontal pairs of opposing channel members mounted in spaced apart vertical stacks transverse to the enclosure means;
    (c) said stacks of channel pairs slidably reclining the decoy bases to retain side by side rows of said decoys, the top most pair of a stack being adapted to retain decoys in the sentinel position and the pairs therebelow decoys in the feeder position;
    (d) the side walls of said enclosure means having vertical door means for each vertical stack of channel pairs positioned to permit transverse insertion and withdrawal of said decoys;
    (e) the rear most stack of channel pairs defining storage space with the enclosure floor for gear and game, the rear wall of the enclosure having door means to provide access to the storage space.

11. Apparatus of claim 10 having door means in both side walls.

* * * * *